United States Patent [19]

Wedgwood et al.

[11] Patent Number: 4,856,079
[45] Date of Patent: Aug. 8, 1989

[54] ADAPTIVE AND PROGRAMMABLE BLANKER

[75] Inventors: Janet E. Wedgwood, Roslyn Heights; Dennis W. Berde, Melville; Steven J. Bocskor, Ronkonkoma; George E. Cotter, Commack, all of N.Y.

[73] Assignee: Grumman Aerospace Corporation, Bethpage, N.Y.

[21] Appl. No.: 93,399

[22] Filed: Sep. 4, 1987

[51] Int. Cl.[4] .............................................. H04B 1/10
[52] U.S. Cl. ..................................... 455/50; 375/104; 455/223
[58] Field of Search .................. 375/104; 455/80, 223, 455/224, 303, 304, 305, 50; 342/19, 89, 91, 94, 176, 203, 91, 176; 340/825.83

[56] References Cited

U.S. PATENT DOCUMENTS 4,422,072 12/1983 Cavlan ............................ 340/825.83
4,637,073 1/1987 Selin et al. ............................ 455/80

Primary Examiner—Robert L. Griffin
Assistant Examiner—Michael Ricci
Attorney, Agent, or Firm—Richard G. Geib; Daniel J. Tick; Bernard S. Hoffman

[57] ABSTRACT

An electronic blanking system having a plurality of inputs from a number of radio frequency transmitters and a plurality of outputs for supplying blanking pulses to receivers which are in proximity to the transmitters includes input circuitry for processing input pulses from the inputs to produce processed input signals. Timers alter the timing of the processed input signals as required to produce the needed blanking pulses. Matrix means are provided for routing each blanking pulse to the outputs. A processor controls each matrix to determine the routing. Output drivers supply the blanking pulses, at predetermined voltage levels, to the outputs. The processor also controls the timers to determine the manner in which the timing is altered. The timers includes at least one of a delay for delaying the processed input signals, a stretching circuit for increasing the length of the processed input signals, and a truncator for truncating the length of the processed input signals. Each matrix includes a product generator for determining logical products of at least two processed input signals, and a sum generator for determining the logical sum of the logical products. An externally programmable memory has a first portion for storing instructions for the processor and a second portion for storing data to determine at least one of the operations of the timers and each matrix. At least the second portion of the memory is an electronically erasable read only memory.

35 Claims, 8 Drawing Sheets

ADAPTIVE AND PROGRAMMABLE BLANKER

BACKGROUND OF THE INVENTION

The invention relates to a blanker for reducing interference between clustered radio transmitters and receivers. More particularly, it relates to blankers which are programmable so that the nature of the blanking pulses supplied can be easily changed. Further, the present invention relates to blanker systems that are adaptive in their ability to accept various input pulses from the transmitters and to generate output signals of various voltages.

Hard-wired logic blanker systems have been used for many years in applications where a plurality of transmitters and receivers are in close proximity, or operate on closely spaced frequencies. Suitably timed blanking pulses of the proper amplitude must be supplied to the receivers so as to overcome the effects of interference from the transmitters, when the transmitters are in operation.

In critical applications, such as military aircraft, a blanker system must be of extremely high reliability. If it is necessary to change the components in the system or to rewire the logic to change the performance in light of a new environment or new sets of requirements, the equipment must be requalified. This is a time consuming and expensive process.

More recently, programmable interference blanking systems have been proposed. In such systems, information concerning the exact configuration required can be fed into a microprocessor which then provides outputs to control the blanking system. Since the data supplied to the microprocessor can be changed, the manner in which the blanking system performs can also be modified.

In these proposed blankers, input signals are generally sent to a switching matrix to provide signals at appropriate outputs in response to given inputs. The signals of the outputs are then processed so as to change their timing. The resulting output pulses are suitably buffered and applied to the appropriate receivers.

This approach generally does not provide the amount of flexibility required. For example, it may be desirable to have an output supplied when any one of four inputs is activated. However, the four inputs may occur at different times. This approach is not satisfactory when the output pulse must occur at a time not dependent upon which input has caused it to occur.

The above-mentioned approach also does not permit control of the output pulses in a flexible and programmable manner in response to a series of logic control pulses. For example, when many electronic systems may be installed in an aircraft, the requirements for blanking pulses will depend upon which systems are, in fact, installed and operating. Further, there may be several modes of operation for some of the systems, and it may be desirable to change the precise nature of the blanking pulses to optimize overall system performance in accordance with which systems are operational, and the modes in which they are operating, at a given time. Proposed blanking systems do not generally provide such enhanced flexibility.

While it is desirable to be able to reprogram a blanker system without "opening the box" to avoid any sort of requalification requirements, if the nature of the input signals is drastically changed, it may be necessary to change components within the system. Proposed blanker systems have not generally dealt adequately with the question of quickly and easily changing such components in a manner likely to avoid most of the requalification requirements.

SUMMARY OF THE INVENTION

It is a principal object of the invention to provide a programmable blanker system having maximum flexibility with respect to the outputs produced for a given set of inputs.

It is a further object of the invention to provide a programmable blanker system capable of accepting logic control signals as well as signals indicative of transmission so that the outputs can be flexibly controlled.

It is another object of the invention to provide a blanker system which can alter the timing of pulses in accordance with a preprogrammed set of instructions.

It is still another object of the invention to provide a blanker system wherein the voltage of the output pulses can be readily selected from one of several predetermined voltages.

It is yet another object of the invention to provide a blanker system wherein components of the system used for impedance matching of the inputs can be changed without requiring extensive requalification of the blanker system.

In accordance with the invention, an electronic blanking system having a plurality of inputs from a number of radio frequency transmitters and a plurality of outputs for supplying blanking pulses to receivers which are in sufficient proximity to the transmitters so that output from the transmitters has a deleterious effect upon operation of the receivers is described herein. Said blanking system includes input processing means for processing input pulses from the inputs to produce processed input signals. Timing means is provided for altering the timing of the processed input signals, if required, to produce the needed blanking pulses. Matrix means is provided for routing the blanking pulses along a path to the outputs. A processor means controls the matrix means to determine the routing. Output means supplies the blanking pulses to receiving equipment at predetermined voltage levels.

The processor means also controls the timing means to determine the manner in which the timing is altered. The timing means includes at least one of a delay means for delaying the processed input signals, stretching means for increasing the length of the processed input signals, and truncating means for truncating the length of the processed input signals.

The matrix means includes product means for obtaining logical products of at least two processed input signals, and summing means for obtaining the logical sum of the logical products.

The blanking system further comprises control inputs for supplying to the input processing means logic control signals. The logic control signals thus also produce processed input signals for the timing means.

The blanking system further comprises a programmable memory having a first portion for storing instructions for the processor and a second portion for storing data to determine at least one of the operations of the timing means and the matrix means. At least the second portion of the memory means is an electronically erasable read only memory.

The output means includes a voltage selector for selecting the predetermined voltage level. The input processing means includes a voltage divider having a plurality of resistors. The voltage divider includes connection means for permitting different size resistors to be electrically connected within the input circuitry.

BRIEF DESCRIPTION OF THE DRAWINGS

In order that the invention may be readily carried into effect, it will now be described with reference to the accompanying drawings, wherein.

DETAILED DESCRIPTION OF THE PREFERRED EMBODIMENT

The invention is described with respect to the preferred embodiment of a blanker system as used in an aircraft having various transmitters and receivers such as those used for radar, communication, navigation, and electronic measures and countermeasures. It will be understood that the blanker system of the present invention may be used in various other applications such as on board ship, or in a land installation where a number of transmitters and receivers which, because of their relative proximity, are subject to unwanted interference if proper blanking pulses are not supplied to the receivers.

Figure 1:
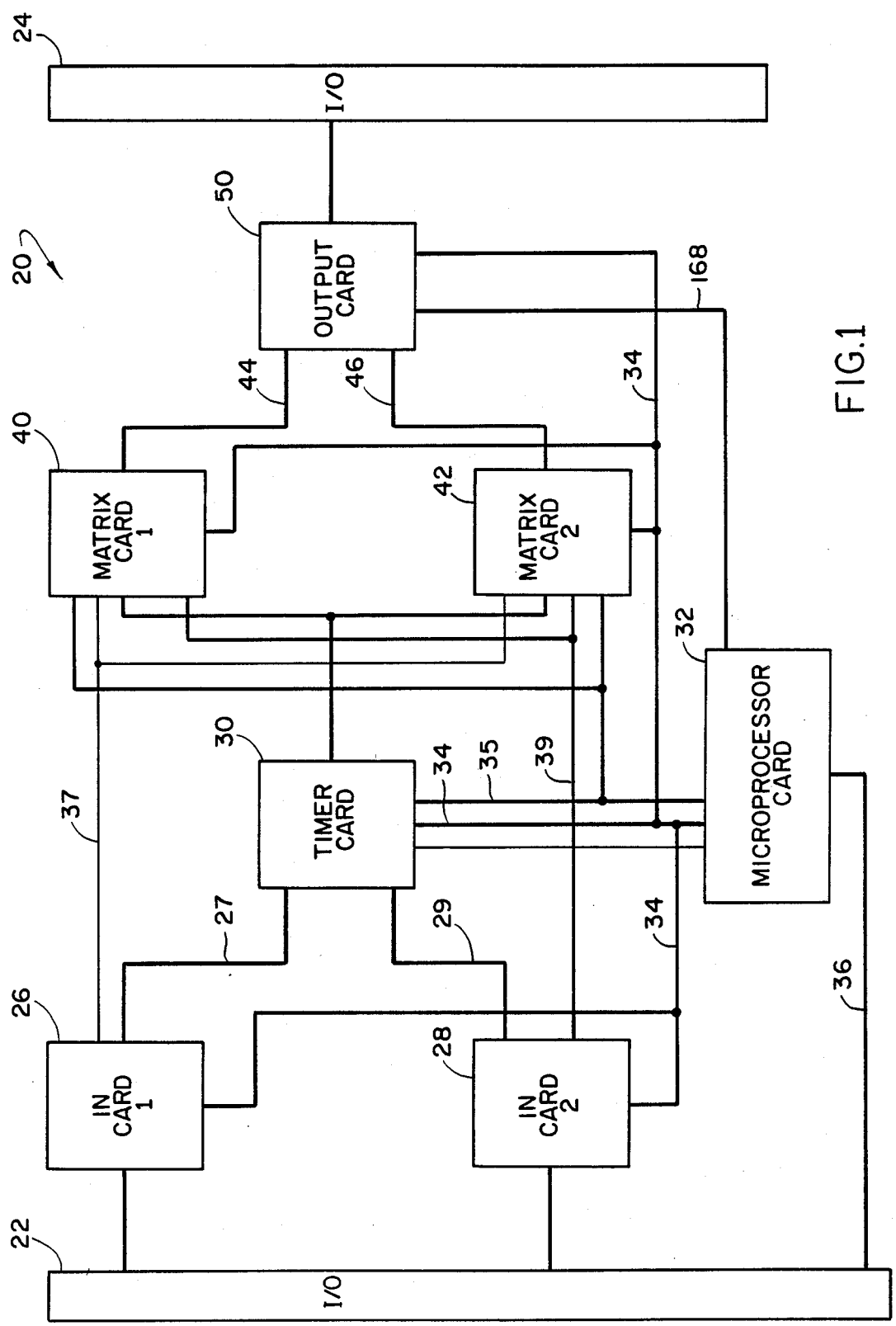
FIG. 1 is a block diagram of a blanking system in accordance with the invention.

Referring to FIG. 1, the blanker system 20 of the present invention is connected to a host aircraft system (not shown) by input and output connectors 22 and 24. The exact arrangement of inputs and outputs, the number of connectors and the precise nature of the connectors is not important with respect to the description of the present invention but will depend upon the particular aircraft or other installation involved. In general, connectors 22 and 24 will be high performance connectors capable of operating over a large range of ambient temperatures, as is generally required in aircraft applications. Although for purposes of illustration, connector 22 is shown to provide inputs while connector 24 provides outputs, it will be understood that in practice each of connectors 22 and 24 may serve to connect inputs to and outputs from blanker system 20. In other words, all connections between blanker system 20 and another aircraft system, such as a radar system, are advantageously made to a single connector so as to minimize the total number of cable harnesses that are required.

Inputs to blanker system 20, in the form of logic pulses of various durations and amplitudes, typically present when a transmitter is active, are provided to one of two input cards 26 and 28. As more fully described below, input cards 26 and 28 include level converters for converting the pulses from the various transmitters to TTL logic levels and provide proper impedance terminations for the lines carrying these pulses.

The TTL output signals from input cards 26 and 28 are supplied to a timer card 30 by busses 27 and 29, respectively. Timer card 30 includes two timer gate arrays which are used to alter the timing of the processed input signals to timer card 30, as required. Specifically, the timer gate arrays (FIG. 5A and FIG. 5B) can alter the timing of the input pulses by extending the pulses in length, truncating the pulses or delaying the pulses. The specific manner in which the gate arrays of timer card 30 alter the timing is controlled by data received from microprocessor card 32 by way of a data bus 34 to locations specified by an address bus 35. An electronically erasable read only memory, resident on microprocessor card 32 (FIG. 8), may be externally programmed by means of a program bus 36, thus changing the data supplied to timer card 30.

The pulses of modified timing produced by timer card 30, as well as unmodified pulses discussed below, are routed to each of the two matrix cards 40 and 42. Matrix cards 40 and 42 determine the routing of the blanking pulses from the timer card 30 to an output card 50 by way of output buses 44 and 46. The routing of the pulses is controlled by data from microprocessor card 32 supplied by data bus 34 and directed by addresses on address bus 35. The data is stored in the electronically erasable read only memory (FIG. 8) associated therewith.

To further enhance flexibility, one processed input signal from input card 26 and three processed input signals from input card 28 (the above-mentioned unmodified pulses) are sent directly to both matrix card 40 and matrix card 42 by a line 37 and a bus 39, respectively.

Output card 50 contains a series of hybrid output drivers (one for each line on bus 44 and bus 46) which provide current driving capability for the output pulses generated by blanker system 20. These pulses are distributed to the various systems in the aircraft. Connection is made by pins on connector 24 (or connector 22).

Figure 2:
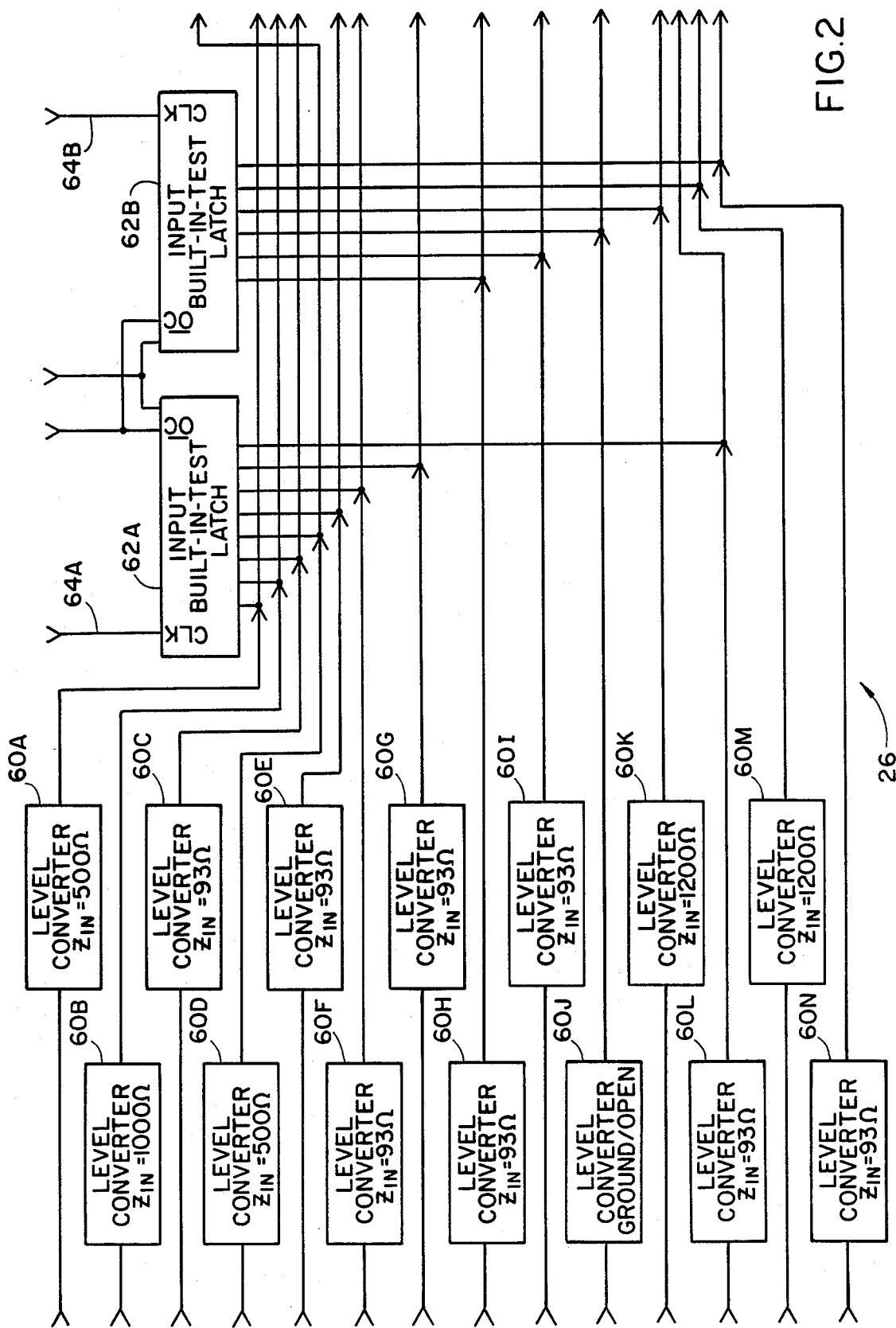
FIG. 2 is a logic flow diagram of one of the input cards of FIG. 1.

Referring to FIG. 2, input card 26 includes a series of fourteen level converters, 60A to 60N. Each level converter is designed to have an appropriate input impedance for the input signal being handled. Further, the values of components within each level converter are selected so that the range of voltages expected for a given input signal is converted to a range of TTL compatible voltages.

The outputs of level converters 60A to 60N are connected to the outputs of built in test (hereinafter BIT) latches 62A and 62B. During BIT of the blanker system 20, control signals are provided to latches 62A and 62B from microprocessor card 32 by way of data bus 34. These signals are held by latches 62A and 62B when an appropriate clock input is provided on line 64A (latch 62A) and line 64B (latch 62B). This data, stored in latches 62A and 62B at the appropriate time under the direction of microprocessor card 32, is used to provide simulate blanking inputs while conducting a BIT procedure.

The outputs of level converters 60A to 60N are carried to timer card 30 by bus 27 (FIG. 1).

Figure 3:
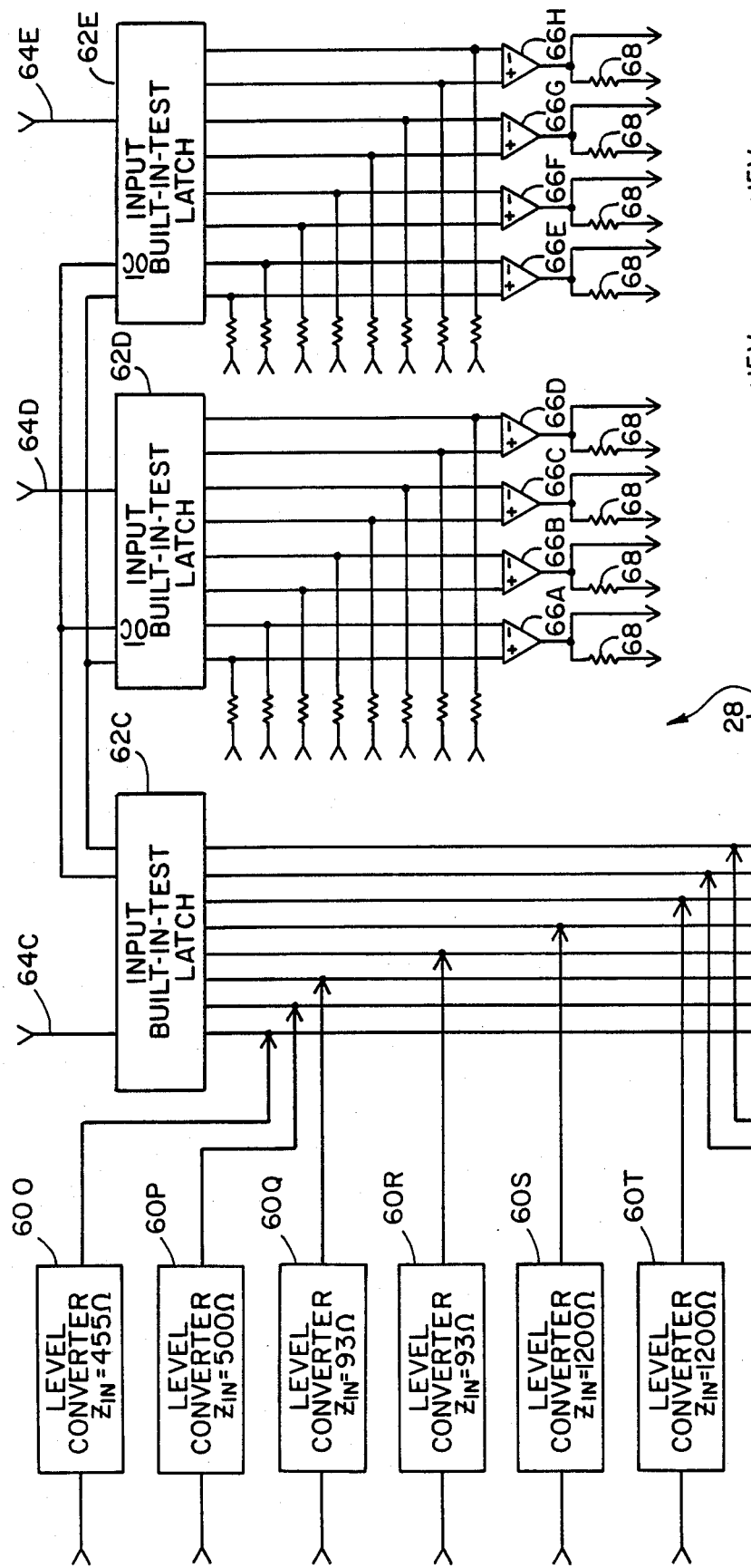
FIG. 3 is a logic flow diagram of the second input card of FIG. 1.

Referring to FIG. 3, input card 28 is similar in many respects to input card 26. A series of eight level converters 60O to 60V, each having an input impedance appropriate for terminating the line conducting a signal to its input, and an appropriate voltage divider, as described above with respect to level converters 60A to 60N, are provided. The outputs of level converters 60O to 60V are connected to the outputs of a BIT latch 62C clocked by signals on an enable line 64C in a manner similar to that described above with respect to latch 62A and latch 62B. Outputs of level converters 60O through 60V are conducted along bus 29 to timer card 30 (FIG. 1). Input signals are provided to latch 62C from microprocessor card 32 by way of data bus 34.

Level converters 60A to 60V are used for signals which are supplied by coaxial cables. Some of the outputs of aircraft systems are supplied as signals traveling along twisted shielded pairs of wires. Four such pairs of wires are connected to the inputs of four differential receivers 66A, 66B, 66C and 66D. These inputs are connected to the output bits of a BIT latch 62D which, in a manner similar to latches 62A to 62C, provides BIT data (provided to its inputs by microprocessor card 32). The outputs of differential receivers 66A to 66D are provided to timer card 30 and through resistors 68, to respective test points (not shown) which may be, for example, pins of connectors 22 or 24.

A second series of differential receivers 66E, 66F, 66G, and 66H perform a similar function with respect to an additional four 2-wire inputs from the aircraft systems. A latch 62E performs in a manner identical to latch 62D for purposes of BIT. The outputs of differential receivers 66E to 66H are handled in a manner identical to those of differential receivers 66A to 66D.

Although not shown or described herein, it will be understood that if additional inputs are to be processed, it is merely necessary to add additional level converters or differential receivers and, for purposes of BIT, and additional latch capability.

Figure 4:
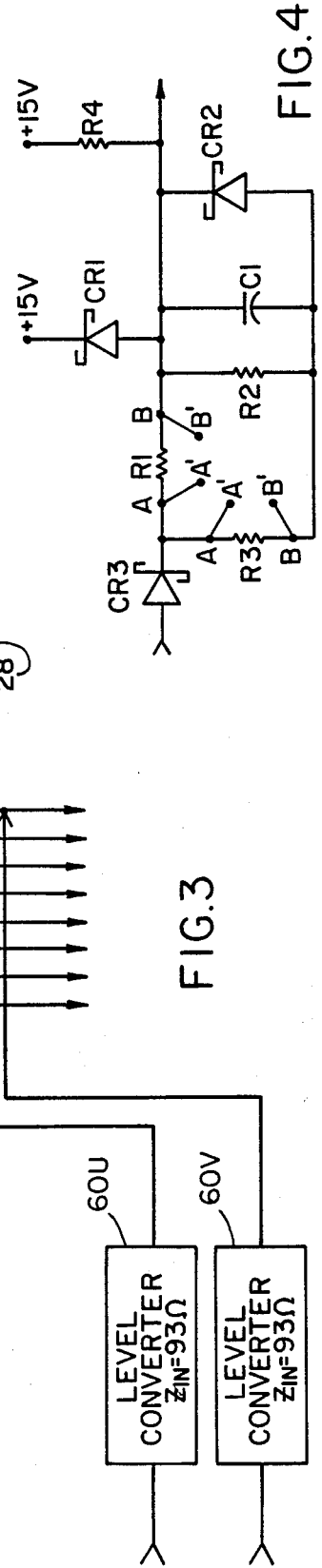
FIG. 4 is a schematic diagram of one of the level converters of FIG. 2 and FIG. 3.

All of the level converters 60A to 60V of input cards 26 and 28 (FIG. 2 and FIG. 3) have the same basic schematic illustrated in FIG. 4. An input coupling diode CR3 and a capacitor C1 are used for relatively low input voltages. Resistor R3 serves as a terminating resistor providing the proper input impedance to match the line supplying the input signal. Resistors R1 and R2 serve as a voltage divider which converts the input voltage to the TTL range. Resistor R4 need be provided only when it is necessary for the input to be pulled up to the positive supply voltage. Diode CR1 clamps the input voltage when the input voltage is at a value large enough to exceed TTL limits after being divided by resistors R1 and R2. Diode CR2 protects against the application of negative voltages to the TTL inputs.

In order to permit some flexibility in the voltage levels supplied to the basic input circuits, the circuit board implementation for the circuit of FIG. 4 has two sets of pads for resistors R1 and R3. At the location for these resistors, provisions are made for accepting either a 3-watt wire wound resistor or a ⅛ watt metal film resistor. As shown in FIG. 4, placing a resistor between pads A–B is equivalent to placing a resistor between pads A'–B' in terms of connection into the circuits, i.e., if resistors were placed at both locations, they would be connected in parallel. However, the spacing between pads A and B is appropriate for one size resistor while the spacing between pads A' and B' is appropriate for the other size resistor.

It is not essential that every level converter circuit 60A to 60V have this double pad arrangement for resistors R1 and R3. However, it is extremely desirable that a significant number of the level converters have such arrangement to permit greater flexibility in the use of blanker system 20.

The selection of component values, including resistance and power dissipation requirements for resistors R1 to R4, is relatively straightforward and will depend upon the voltage range of the input pulse, the duty cycle of the input pulse and the current sink capability of latches 62A to 62E. If a type 54F374 latch is used, then the current sinking capability is approximately 20 ma.

Figure 5A:
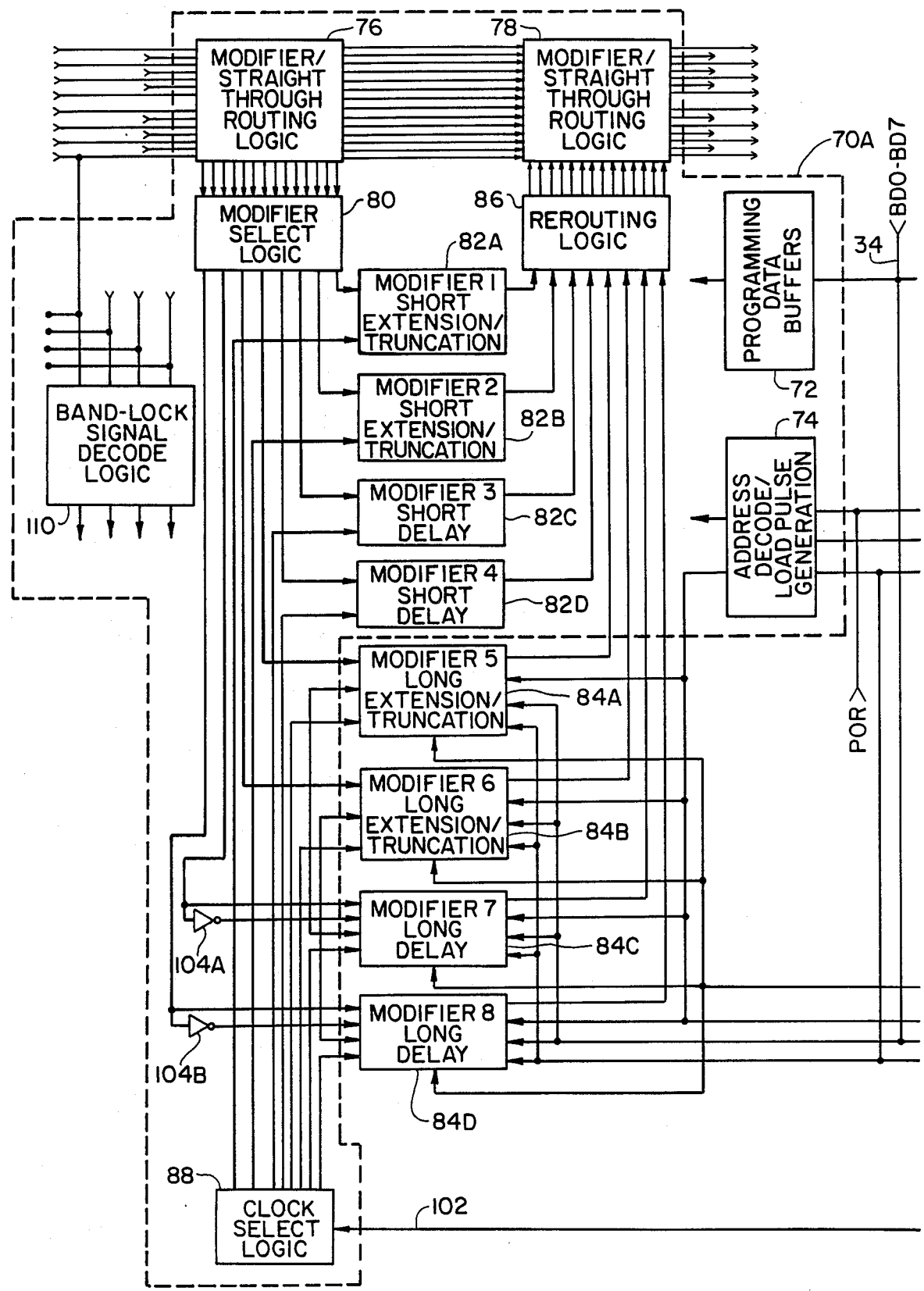
FIG. 5A and FIG. 5B when placed together with FIG. 5A on the left and FIG. 5B on the right constitute a logic flow diagram of the timer card of FIG. 1.
Figure 5B:
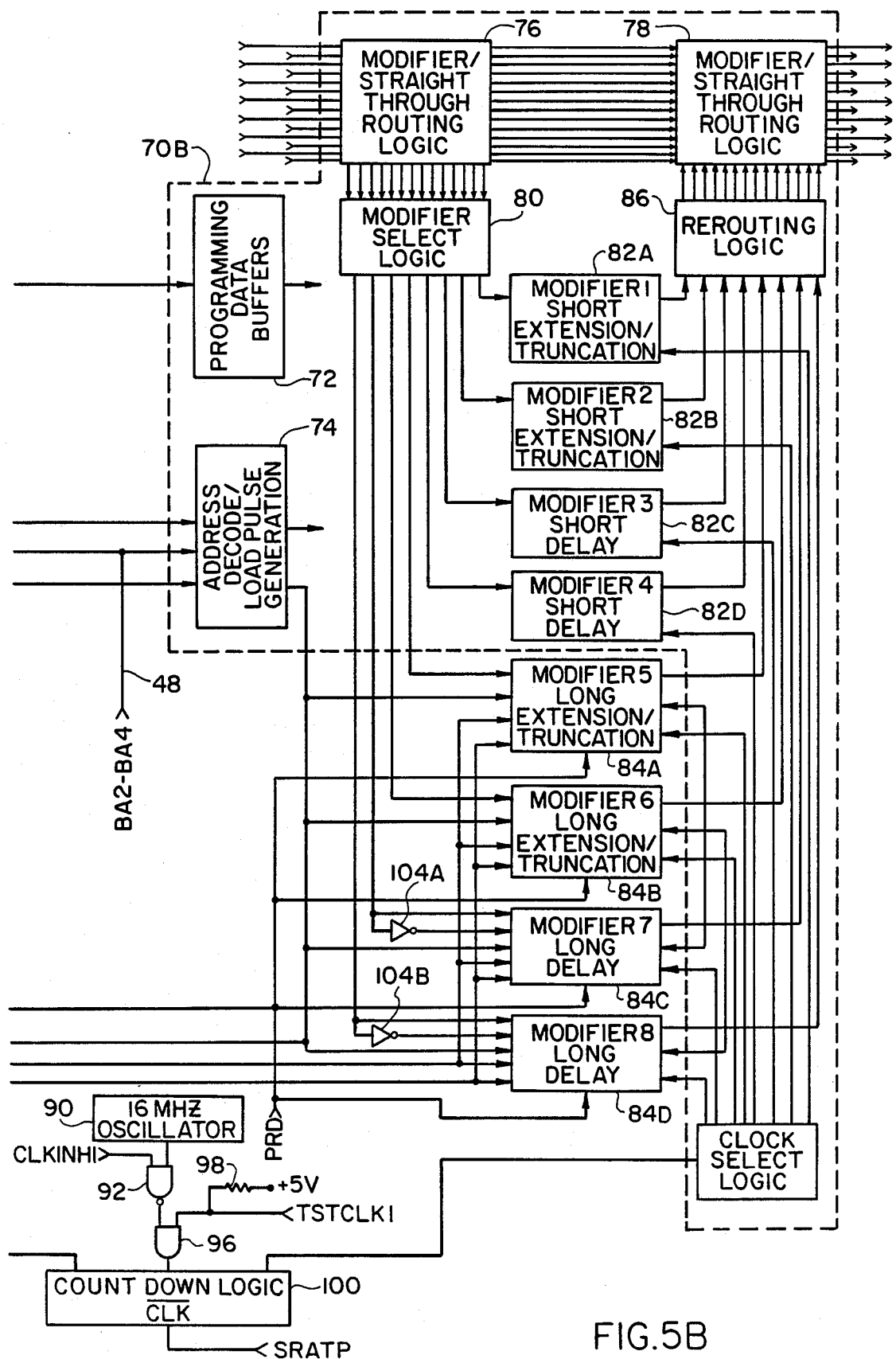

Referring to FIG. 5A and FIG. 5B, timer card 30 includes a timer gate array 70A (FIG. 5A) and a timer gate array 70B (FIG. 5B). Timer gate arrays 70A and 70B are programmed by the microcontroller on microprocessor card 32. Specifically, each timer gate array 70A and 70B includes programming data buffers 72 which buffer data supplied from microprocessor card 32 by way of data bus 34. Addresses, supplied on address bus 48, are routed to address decode/load pulse generators 74 within timer gate arrays 70A and 70B. The address information serves essentially as chip select data which determines where the data from microprocessor card 32, supplied eight bits at a time, is routed within timer gate arrays 70A and 70B. In all, there are approximately 130 latches on timer card 30 which must be programmed with data from microprocessor card 32, as explained more fully below. It will be understood that this discussion applies to both timer gate arrays 70A and 70B.

Each timer gate array includes a first modifier/straight through routing logic 76. Containing a series of latches and AND gates, modifier/straight through routing logic 76 (hereinafter first routing logic 76) is programmed by data from microprocessor card 32 so that any one of up to sixteen inputs (14 are shown in FIG. 5A and FIG. 5B) is either routed straight through to a second modifier/straight through routing logic 78 (hereinafter second routing logic 78) or is routed to a timing modifier by a modifier select logic 80. Appropriate latches in modifier select logic 80 are programmed with data from microprocessor card 32 by means of programming data buffer 72 and address decode/load pulse generator 74. Second routing logic 78 is programmed in the same manner.

Input pulses routed straight through first routing logic 76 go directly to second routing logic 78 and are immediately available as outputs. This approach is useful when an input pulse from a transmitter must generate an output blanking pulse with virtually no delay and of the same width as the input pulse. By using high speed CMOS logic, total delays can be kept below 30 nsec.

Any one of the inputs to first routing logic 76 may be directed to an input of modifier select logic 80. However, modifier select logic 80 has only eight outputs. Each output goes to one of eight timing modifiers. Timing modifiers 82A, 82B, 82C and 82D are internal to timer gate arrays 70A and 70B. These timing modifiers are called short modifiers and provide highly accurate timing. For example, delays of approximately 4 microseconds ±100 nsec are typical contain four-bit software programmable timers. Timing modifiers 82A, 82B, 82C and 82D are implemented with six short timers. Timing modifiers 82A and 82B can be programmed as either extenders or truncators. The remaining four short timers make up timing modifiers 82C and 82D. The delay introduced by these latter timing modifiers is implemented with two timers, one for the leading edge and one for the trailing edge of an input pulse. As a result, the delays of the leading and trailing edges need not be equal. The six timers of timing modifiers 82A, 82B, 82C and 82D can be programmed to run at various clock speeds, as described in more detail below.

Each timer gate array 70A and 70B is interfaced to external timing modifiers 84A, 84B, 84C and 84D. These timing modifiers provide longer, less accurate timing. Delays of up to 520 ms ±10 μs are typical. Each of timing modifiers 84A, 84B, 84C and 84D is of Intel type 8253. Each 8253 chip provides three independent sixteen-bit software programmable counters, with each counter having its own clock. Timing modifiers 84A and 84B are used for extension or truncation. Timing modifiers 84C and 84D are used for delay.

Programming of internal timing modifiers 82A, 82B, 82C and 82D and external timing modifiers 84A, 84B, 84C and 84D is accomplished with data from programming data buffer 72 directed to the proper latch by the output of the address decode/load pulse generator 74.

Internal timing modifiers 82A, 82B, 82C and 82D are clocked by and external timing modifiers 84A, 84B, 84C and 84D are controlled by the output of a clock select logic 88. A basic 16 MHz clock 90 provides a high frequency clock signal by way of a first input of an AND gate 92, which has an inverting output. In view of the presence of a pull-up resistor 94, connected to a second input of AND gate 92, the pulses from clock 90 are passed through gate 92 unless an appropriate terminal on connector 22 or 24, which is electrically connected to the second input of AND gate 92, is shorted to ground so as to inhibit transmission through gate 92. The output of gate 92 is provided to a first input of an AND gate 96 and is normally passed through AND gate 96 in view of the presence of a pull-up resistor 98 connected to the second input of AND gate 96. However, if the second input of AND gate 92 is grounded to inhibit the transmission of the clock signal through AND gate 92, an external clock signal, used for test purposes, may be applied to the second input of AND gate 96 by way of a line to a pin on connector 22. In either case, the output of AND gate 96 is provided to a count down logic 100 which is basically a frequency divider. Logic 100 provides outputs at 16 MHz, 4 MHz and 1 MHz to clock select logic 88 by way of a clock bus 102. Select logic 88 divides the 1 MHz signal supplied by count down logic 100 by a factor of eight to produce a 125 KHz clock signal. The clocks for timing modifiers 84A, 84B, 84C and 84D are selected to be 1 MHz or 125 KHz by programming clock select logic 88. The counters in timing modifiers 82A, 82B, 82C and 82D are selected to be either 16 MHz or 4 MHz by clock select logic 88. For test purposes, however, 125 KHz can also be selected. Clock select logic 88 is programmed by data from programming data buffers 72 as directed by an address supplied to address decode/load pulse generator 74.

The inputs to timing modifiers 84C and 84D are inverted by inverters 104A and 104B, respectively. The inverted signals are used to trigger leading edge delay counters and the uninverted signals trigger falling edge delay counters.

The modified timing signals from internal timing modifiers 82A, 82B, 82C and 82D and from external timing modifiers 84A, 84B, 84C and 84D are transmitted to rerouting logic 86. Rerouting logic 86, which is programmed by data from programming data buffer 72, as specified by address decode/load pulse generator 74, provides any one of its eight inputs thereto to any one of its sixteen outputs which are the inputs to second routing logic 78. Second routing logic 78 provides the signals thus supplied to any one of its outputs in accordance with programming, as noted above.

To further enhance the versatility of the system according to the invention, provisions may be made for altering the processing of signals in accordance with the mode of operation of an aircraft system, as discussed below with reference to FIG. 6. For example, the need for a blanking signal may depend on the particular frequency band of operation of a transmitter (such as a Jammer) having multiband transmission capability. To provide such versatility, a band-look signal decode logic 110 is provided within the timer gate arrays. Although shown only in timer gate array 70A, it will be understood that such capability may also be provided in timer gate array 70B.

Band-look signal decode logic 110 may be implemented as a look-up table. For a transmitter operating within eight possible frequency bands, the band of operation is unambiguously specified by the states of four logic inputs. One of these inputs is also provided as an input to first routing logic 76. Decode logic 110 provides four output signals. The logic state of these output signals is determined by the contents of the look-up table. These outputs serve as discrete enable signals, as described below with reference to FIG. 6. Thus, whether certain blanking pulses are generated or not is determined by the band of operation of the transmitter supplying encoded transmission band information to decode logic 110.

Figure 6:
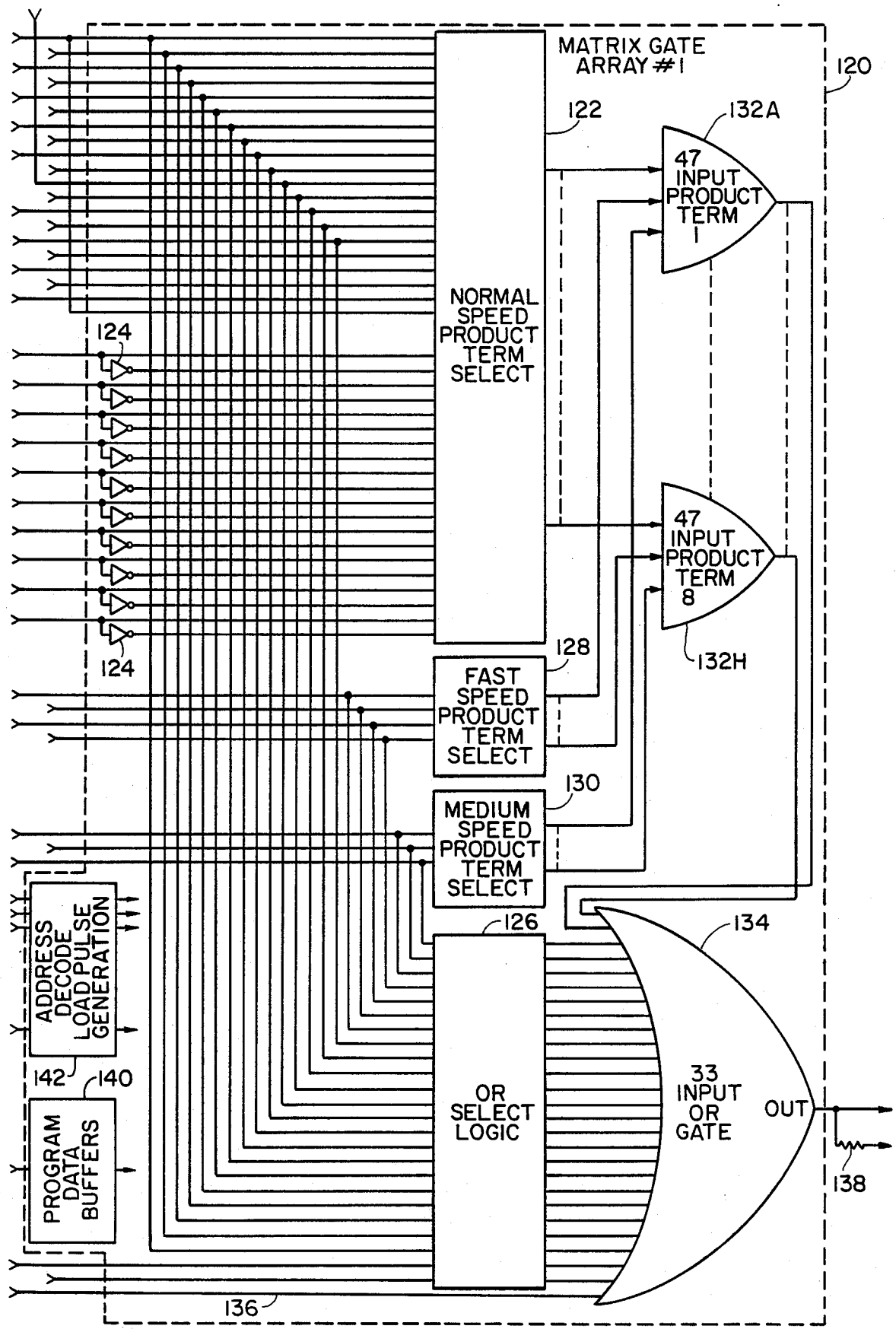
FIG. 6 is a logic flow diagram of one of the nine matrix gate arrays located on each of the matrix cards of FIG. 1.

Referring to FIG. 6, each of matrix cards 40 and 42 (FIG. 1) has a total of nine matrix gate array chips 120. Each chip 120 receives all of the outputs from second routing logic 78 of timer gate arrays 70A and 70B on timer card 30. Each chip 120 produces one output blanking pulse. Chip 120 determines which input is routed to the output. Since there are a total of eighteen chips 120, blanker system 20 produces a total of eighteen blanking outputs.

Twenty of the input signals to chip 120 are actual output signals from transmitters indicating the operation thereof. Thus, these are high-speed or pulse signals which are rapidly processed by chip 120. A select logic 122 includes a series of latches and AND gates which direct selected input signals to one of forty output lines from select logic 122.

An additional ten inputs to chip 120 include discrete enable signals from various systems on board the aircraft. These signals, rather than being rapidly changing in time, generally indicate that a particular system is operating or specify that a particular mode of operation for a system has been selected. These inputs control whether an output signal is produced in response to the other high speed inputs. In order to achieve maximum flexibility, an inverter 124 is provided for each of these 10 enable inputs. The inverted enable signals are also supplied to select logic 122.

Of the twenty signals supplied to select logic 122, fifteen (the pulse signals) are also supplied directly to an OR select logic 126 to assure minimum throughput delay.

Four additional inputs to chip 120 are provided to a fast product term select logic 128 (hereinafter "fast select logic 128"). These inputs are also provided to OR select logic 126. An additional three inputs to chip 120 are provided to a medium speed product term select logic 130. These inputs are also provided to OR select logic 126.

The 40 outputs of select logic 122, the four outputs of fast select logic 128 and the three outputs of medium speed select logic 130 are each provided to one of the forty seven inputs of each of eight product term generators 132A to 132H. Product term generators 132A to 132H are essentially forty seven input AND gates. Thus, up to eight product terms may be made up of any number of the ten discrete enable signals or their complements and twenty seven pulse signals. The products are then summed ("OR"d) with each other.

The output of each of product term generators 132A to 132H is connected to one input of a thirty three input OR gate 134, which serves as a sum generator. An additional twenty four inputs of OR gate 134 are each connected to one of the twenty four outputs of OR select logic 126. An additional input to OR gate 134 is a test line 136 connected to a pin on connector 22, thus permitting a test of OR gate 134.

The output of each of OR gates 134 of all eighteen of chips 120 is conducted to output card 50 by way of output busses 44 and 46 (FIG. 1). Each output is also conducted through a resistor 138, to a test point, which is preferably a pin on one of connectors 22 or 24.

The operation of select logic 122, fast select logic 128, medium speed select logic 130 and OR select logic 126, each having latches and AND gates, is controlled by data from microprocessor card 32 stored in program data buffers 140 which is directed to the appropriate latch by address decode/load pulse generator 142, in the same manner as noted above with respect to the discussion of the operation of timer card 30.

The arrangement of FIG. 6 produces product terms of the various input signals in accordance with the programming provided. Further, the output is the sum of the various products.

Figure 7:
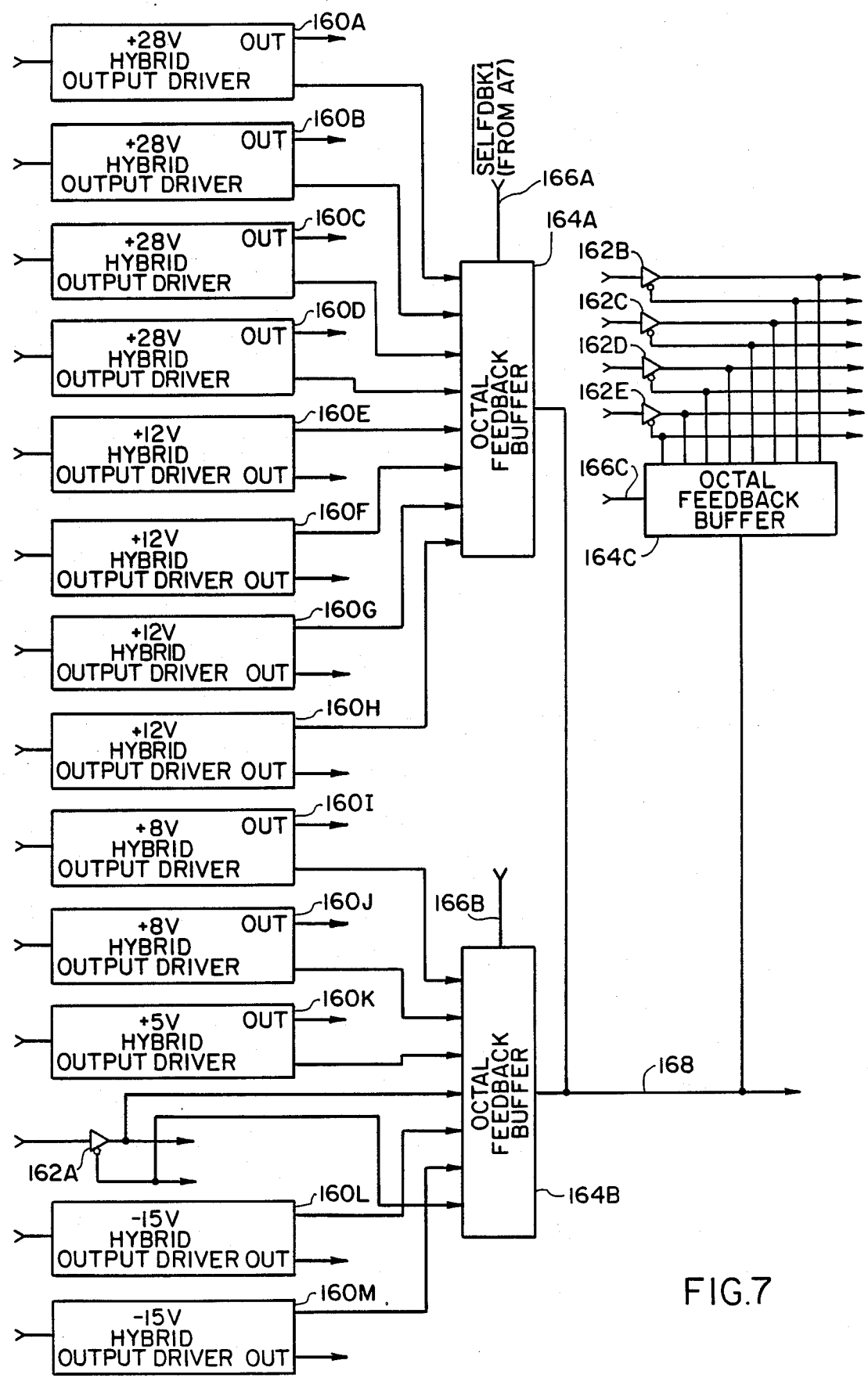
FIG. 7 is a logic flow diagram of the output card of FIG. 1.

Referring to FIG. 7, thirteen of the eighteen output signals from matrix cards 40 and 42 are routed to hybrid output drivers 160A to 160M. A first output of each of these drivers is connected to a pin of connector 24, thus providing blanking pulses externally.

The remaining five signals from matrix card 40 and matrix card 42 are each routed to one of five differential drivers 162A to 162E. The outputs of these differential drivers are connected to pins on connector 24, thus providing differential blanking pulses externally, as is required for some aircraft systems.

A second output of each of hybrid output drivers 160A to 160H is provided to a single input of an eight bit or octal feedback buffer 164A. A second output of each of hybrid output drivers 160I to 160M, as well as the two outputs of differential driver 162A are provided to one of the seven inputs of a second octal feedback buffer 164B. Each of the outputs of differential drivers 162B to 162E is connected to one of the inputs of an octal feedback buffer 164C. When an appropriate command is received from microprocessor card 32, along buffer control lines 166A, 166B and 166C which control octal feedback buffers 164A, 164B and 164C, respectively, the normally tristated outputs of these buffers are turned on. The buffered feedback outputs are supplied by a bus 168 to microprocessor card 32. This data is used for BIT purposes. Specifically, when latches 62A, 62B, 62C, 62D and 62E (FIG. 2 and FIG. 3) inject BIT data to the inputs, octal feedback buffers 164A, 164B and 164C return the output generated by blanker system 20. This data is transmitted to microprocessor card 32, where a comparison is run to determine whether the data produced at the outputs of blanker system 20 is appropriate for the inputs; i.e., whether there is an error.

Of the thirteen hybrid output drivers, four deliver pulses at twenty eight volts, four at twelve volts, two at eight volts, one at five volts and two at minus fifteen volts. The output drivers are of conventional design in many respects. However, further adaptability is provided by allowing any output driver to be replaced by a hybrid output driver supplying a different output voltage. To accomplish this, all five voltages are available to each of the hybrid output driver chips. Internally each of the hybrid output drivers picks up whichever supply voltage is required to produce the desired voltage. The twenty eight volt hybrid output drivers are capable of driving a load of 500 ohms. All other hybrid output drivers can drive a load of 93 ohms. All of the outputs are short circuit protected.

The five differential drivers 62A to 62E are selected so that the outputs are RS-422 compatible.

Figure 8:
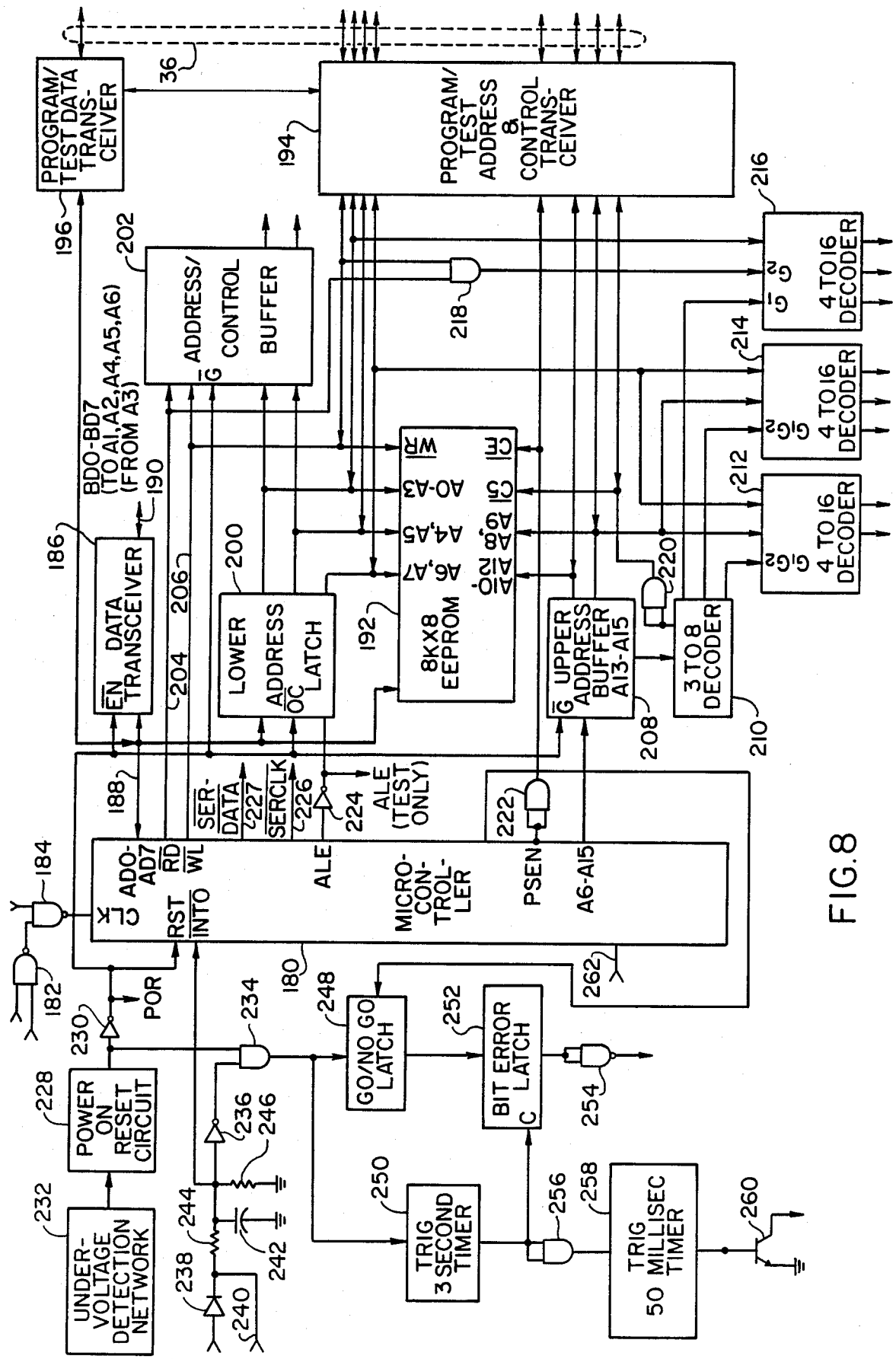
FIG. 8 is a logic flow diagram of the microprocessor card of FIG. 1.

Referring to FIG. 8, the microprocessor card 32 is controlled by a microcontroller 180. Microcontroller 180 is preferably an Intel type 8031 with 128 bytes of internal RAM. Microcontroller 180 is clocked at a rate of 8 MHz by way of AND gates 182 and 184 which either pass the 8 MHz clock from a first input of AND gate 182 or provide a test clock input by way of AND gate 184 if a second input of AND gate 182 is connected to logic zero.

Microcontroller 180 is connected to a data transceiver 186 by way of an eight bit bidirectional data/address bus 188. A tristate bidirectional data bus 190 provides data from microcontroller 180 to input card 26, input card 28, timer card 30, matrix card 40 and matrix card 42. Data from output card 50 is supplied to microcontroller 180 along this same transmission path when used in reverse.

Microcontroller 180 operates under the control of a program stored in electronically erasable read only memory 192. Memory 192 is preferably a XICOR type 2864A 8 Kbyte EEPROM. Memory 192 is programmed through a program/test address and control transceiver 194 and a program/test data transceiver 196 (hereinafter transceiver 196) which interface to the lines of programming bus 36. Control transceiver 194 handles address information, while data transceiver 196 handles program data information. Control transceiver 194 and transceiver 196 have tristate bidirectional receivers and transmitters permitting monitoring of the operation of microcontroller 180 from, or the injection of program information to, pins of connector 22 associated with program bus 34.

Program data supplied to transceiver 196 may include instructions for operation of microcontroller 180 or data which must be sent to the various gate arrays for programming, or address data specifying to which array the data is to be sent. Memory 192 can be programmed from an external programming source by providing the appropriate control signals and address information by way of control transceiver 194 and programming data by way of transceiver 196.

During monitoring of blanker system 20, data from microcontroller 180 is provided to connector 24 by way of data/address bus 188 and transceiver 196. Address lines may be monitored through the address/control buffer 202 and the program test address and control transceiver 194. The reading and writing of data into address/control buffer 202 is controlled by lines 204 and 206 from microcontroller 180. Address/control buffer 202 provides address/control information to program the gate arrays used in blanker system 20.

During programming from an external programming source, a reset signal is applied to microcontroller 180 causing its outputs to assume the tristate (high impedance) state, thereby allowing the external programming inputs to take complete control of memory 192.

During normal operation, the address data is supplied from microcontroller 180 to both lower address latch 200 (the eight least significant bits), and to upper address buffer 208 (the eight most significant bits). It will be understood that the lower eight bits of the address and the eight bits of data on data/address bus 188 are multiplexed. Of the eight most significant address bits, the three most significant are provided to a 3 to 8 decoder 210. The first output of decoder 210 is provided to the two enable inputs of a first 4 to 16 decoder to 212. Two of the input bits to decoder 212 are another two of the upper address bits from upper address buffer 208. The remaining two bits are from lower address latch 200.

A second output of decoder 210 is supplied to the enable inputs of a second 4 to 16 decoder 214. The same four address bits supplied to decoder 212 are also supplied to decoder 214.

A third output of decoder 210 is supplied to one of the enable inputs of a third 4 to 16 decoder 216. A second enable input is driven by the output of an AND gate 218. The inputs of AND gate 218 are connected to read and write enable lines from microprocessor 180 (lines 204 and 206). Four address bits from lower address latch 200 are provided as inputs to decoder 216.

The outputs of decoders 212, 214 and 216 act as chip select lines specifying which of the twenty gate arrays used in blanker system 20 are to be programmed. In this regard, the three most significant upper address bits and various other of the address bits provided to decoders 212, 214 and 216 specify the gate array to be programmed while the data from address control buffer 202 specifies the particular latch and the data from data transceiver 186 is what is actually programmed into the latch specified.

A fourth output of decoder 210 is provided to both inputs of an AND gate 220. The output of AND gate 220 is provided to the chip select input of memory 192 and is also available as an output at connector 24, by way of control transceiver 194.

An output of microcontroller 180 is provided to both inputs of an AND gate 222. The output of AND gate 222 is provided to the enable input of memory 192 and to control transceiver 194. Thus, during normal operation, microcontroller 180 may enable memory 192, while during programming, memory 192 may be enabled from an external signal source by way of control transceiver 194.

Microcontroller 180 enables the operation of lower address latch 200 by means of an inverter 224 connected to an address latch enable output of microcontroller 180.

For test purposes, the clock and serial data from microcontroller 180 are connected by lines 226 and 227 to pins on connector 24.

Blanker system 20 requires a +28 volt input from the aircraft electrical system. This input is routed through an EMI filter and diode network. The function of the latter is to protect against voltage reversals. Internal power supplies then generate the additional +5, +8,+12 and −15 volts required by the internal circuitry. When power is applied, a voltage on reset circuit 228 supplies a pulse to an inverter 230 which provides at its output a reset signal to microcontroller 180, data transceiver 186, address control buffer 202, lower address latch 200 and upper address buffer 208. The power-on reset signal from inverter 230 is also distributed to address decode/load pulse generators 74 in timer gate arrays 70A and 70B of timer card 30 (FIG. 5A and FIG. 5B); and the address decode and load pulse generator 142 of each matrix gate array chip 120 on matrix cards 40 and 42. A reset from reset circuit 228 may also be triggered by a trigger pulse from an undervoltage detection network 232 so that blanker system 20 does not provide erroneous outputs if the input voltage thereto falls below a minimum voltage required for proper operation.

The output of power-on reset circuit 228 is also supplied to one input of an AND gate 234. The other input of AND gate 234 is provided by the output of an inverter 236.

The BIT described previously is initiated by an electrical input signal in the form of a positive voltage pulse applied to a diode 238 or a positive electrical input signal from a mechanical push button (not shown) providing a signal on line 240. The mechanical push button may be externally mounted on the enclosure of blanker system 20 or may be disposed so that the pilot of the aircraft can command a BIT. The electrical input by way of diode 238 can be provided from a pin on connector 22 from any one of a number of sources requiring that the BIT be initiated.

In either event, a capacitor 242 is charged through a resistor 244. The duration of the input pulses and the time constant defined by capacitor 242 and resistor 244 is such that the input pulses provided are sufficiently long for the voltage across capacitor 242 to reach the TTL trigger level for the input of inverter 236 and the $\overline{\text{INTO}}$ input of microcontroller 180, thus instructing microcontroller 180 to initiate BIT. Capacitor 242 is then discharged through resistor 246.

The output of AND gate 234 is provided to a GO/NO GO latch 248 and the trigger input of a three second timer 250. Latch 248 is set by the output of AND gate 234 and reset by a $\overline{\text{GO}}$ signal from microcontroller 180 which indicates that the BIT procedure has been successfully completed with no errors. However, if there are errors, latch 248 is not reset. Three seconds after the initiation of BIT, a clock signal is provided from timer 250 to a BIT error latch 252. If an error has occurred, the BIT output of latch 252 will be in a first state after receiving the output signal of timer 250 If an error has not occurred, the BIT output will be in a logic state opposite to that of the first state. In either event, the logic signal present at the BIT output of latch 252 is provided to both inputs of an AND gate 254. The output of AND gate 254, which is inverted, is then supplied to a pin of connector 24 as an indication of whether the BIT procedure indicated that blanker system 20 was operational or not. The output of timer 250 is also provided to both inputs of an AND gate 256. The inverting output of AND gate 256 is provided to the trigger input of a 50 msec timer 258. The output of timer 258 is in turn connected to the base of a transistor 260. The collector of transistor 260 is connected to a positive supply voltage through the coil of a mechanical BIT indicator (not shown) which advises the pilot as to whether BIT or a power-on reset has occurred.

To further enhance flexibility of blanker system 20, an aircraft identification input is provided on a line 262 to microcontroller 180. If blanker system 20 is used in two different aircraft, one aircraft will provide a ground, while another aircraft will provide an open connection (equivalent to a high logic state, if a pull-up resistor is used). If sufficient space is available in memory 192, the program and data stored therein may include subprograms and different data for the different aircraft. In other words, based on the input provided on line 262, microcontroller 180 will execute different portions of the program stored in memory 192 so as to properly program the blanker for either aircraft automatically when blanker system 20 is installed in that aircraft. If sufficient memory capacity is available, and more than one aircraft identification input line is provided, there is in principle, no reason why blanker system 20 can not automatically program itself for a variety of aircraft based on identification signals received from the aircraft in which it is installed.

The programming of microcontroller 180 in terms of instructions stored in its internal RAM and the contents of memory 192 is a rather straightforward, routine task and will be described only in general terms. Broadly, microcontroller 180 performs two functions. The first is initialization of blanker system 20. As described above, this requires the programming of the various latches in the timer and matrix gate arrays. The second function is BIT. As described above, with reference to FIG. 7, simulated inputs are provided, and the outputs are compared by microcontroller 180 to expected outputs to determine if proper operation is occurring. This is done with static inputs to determine if the matrix gate arrays are providing proper routing. It may also be done dynamically with the input changing with time to test whether the timer gate array is functioning properly. In this case, the actual outputs are compared to a series of expected outputs as a function of time.

Although shown and described in what is believed to be the most practical and preferred embodiment, it is apparent that departures from the specific method and design described and shown will suggest themselves to those skilled in the art and may be made without departing from the spirit and scope of the invention. We, therefore, do not wish to restrict ourselves to the particular construction described and illustrated, but desire to avail ourselves of all modifications that may fall within the scope of the appended claims.

We claim:

1. An electronic blanking system having a plurality of inputs, said inputs including a plurality of voltage or current pulses of varying duration, said blanking system also having a plurality of outputs for supplying blanking pulses, said system comprising
    input processing means for processing input pulses from said inputs to produce processed input signals;
    timing means for altering the timing of said processed input signals to produce blanking pulses;
    matrix means for routing said processed input signals to said outputs and for routing any of said processed input signals to any of said outputs;
    microprocessor means coupled to said matrix means for controlling said matrix means to determine said routing; and
    output means for supplying said blanking pulses, at a predetermined voltage level, to said outputs.

2. The blanking system of claim 1, wherein said microprocessor means is coupled to said timing means and controls said timing means to determine the manner in which said timing is altered.

3. The blanking system of claim 1, wherein said timing means includes delay means for delaying said processed input signals, stretching means for increasing the length of said processed input signals, and truncating means for truncating the length of said processed input signals.

4. The blanking system of claim 1, wherein said matrix means includes product means for determining logical products of at least two processed input signals, and summing means for determining the logical sum of the logical products.

5. The blanking system of claim 1, further comprising test means for producing processed input signals during testing only.

6. The blanking system of claim 1, further comprising programmable memory means for use by said microprocessor means, said programmable memory means having a first portion for storing instructions for said microprocessor means, and a second portion for storing control data for said timing means and said matrix means.

7. The blanking system of claim 6, further comprising external data communication means for communicating information to be stored to said programmable memory means for storing in said programmable memory means.

8. The blanking system of claim 6, wherein said second portion of said programmable memory means includes regions for storing data sets for programming said blanking system for a plurality of different blanking applications, said blanking system further comprising application selector means coupled to said programmable memory means for permitting selection of one of said data sets stored for programming.

9. The blanking system of claim 8, wherein said application selector means is responsive to an installation identification input which identifies a particular installation for said blanking system and wherein said application selector means selects said one of said data sets in accordance with the installation identification input supplied.

10. The blanking system of claim 6, wherein at least said second portion of said programmable memory means is an electronically erasable read only memory.

11. The blanking system of claim 1, further comprising data communication means for providing a data path for data to and from said microprocessor means.

12. The blanking system of claim 1, further comprising programming means for programming said programmable memory means with instructions for controlling said microprocessor means and data for determining the operation of said matrix means and said timing means.

13. The blanking system of claim 12, further comprising data communications means for communicating programming data to, and operational data from, said programmable memory means.

14. The blanking system of claim 1, wherein said put means includes a voltage selection means for selecting said predetermined voltage level.

15. The blanking system of claim 1, wherein said input processing means comprises a voltage divider including a plurality of resistors, said voltage divider including connection means for permitting at least one of different size resistors to be electrically connected as at least one of said plurality of resistors.

16. The blanking system of claim 15, wherein said connection means includes regions of metallization on a circuit board, said region being sized, shaped and positioned to provide connection pads for a resistor of a first size and for a resistor of a second size, said first size being different than said second size.

17. An electronic blanking system having a plurality of inputs, said inputs including a plurality of voltage or current pulses of varying duration, said blanking system also having a plurality of outputs for supplying blanking pulses, said system comprising:
 input processing means for processing input pulses from said inputs to produce processed input signals;
 blanking pulse generation means for processing said processed input signals to produce blanking pulses, said blanking pulse generation means including a logic matrix for routing said processed input signals to said outputs and for routing any of said processed input signals to any of said outputs, said logic matrix having
 product means for determining logical products of at least two processed input signals and
 summing means for determining the logical sum of the logical products;
 microprocessor means coupled to said logic matrix for controlling said logic matrix to determine said routing; and
 output means for supplying each of said blanking pulses to one of said outputs.

18. The blanking system of claim 17, further comprising timing means for altering timing of said processed input signals, wherein said microprocessor means is coupled to said timing means and controls said timing means to determine the manner in which said timing is altered.

19. The blanking system of claim 18, wherein said timing means includes delay means for delaying said processed input signals, stretching means for increasing the length of said processed input signals, and truncating means for truncating the length of said processed input signals.

20. The blanking system of claim 17, further comprising test means for producing processed input signals during testing only.

21. The blanking system of claim 18, further comprising programmable memory means for use by said microprocessor means, said programmable memory means having a first portion for storing instructions for said microprocessor means, and a second portion for storing control data for said timing means and said logic matrix.

22. The blanking system of claim 21, further comprising external data communication means for communicating information to be stored to said programmable memory means for storing in said programmable memory means.

23. The blanking system of claim 21, wherein said second portion of said programmable memory means includes regions for storing data sets for programmable said blanking system for a plurality of different blanking applications, said blanking system further comprising application selector means coupled to programmable memory means for permitting selection of one of said data sets stored for programming.

24. The blanking system of claim 23, wherein said application selector means is responsive to an installation identification input which identifies a particular installation for said blanking system and wherein said application selector means selects said one of said data sets in accordance with the installation identification input supplied.

25. The blanking system of claim 21, wherein at least said second portion of said programmable memory means is an electronically erasable read only memory.

26. The blanking system of claim 17, further comprising external data communication means for providing a data path for data to and from said microprocessor means.

27. The blanking system of claim 18, further comprising programming means for programming said programmable memory means with instructions for controlling said microprocessor means and data for determining the operation of said logic matrix and said timing means.

28. The blanking system of claim 27, further comprising data communications means for communicating programming data to, and operational data from, said programmable memory processor means.

29. The blanking system of claim 17, wherein said output means includes a voltage selection means for selecting said predetermined voltage level.

30. The blanking system of claim 17, wherein said input processing means comprises a voltage divider including a plurality of resistors, said voltage divider including connection means for permitting at least one of different size resistors to be electrically connected as at least one of said plurality of resistors.

31. The blanking system of claim 30, wherein said connection means includes regions of metallization on a circuit board, said region being sized, shaped and positioned to provide connection pads for a resistor of a first size and for a resistor of a second size, said first size being different than sad second size.

32. An electronic blanking system having a plurality of inputs, said inputs including a plurality of voltage or current pulses of varying duration, said blanking system also having a plurality of outputs for supplying blanking pulses, said system comprising
 input processing means for processing input pulses from said inputs to produce processed input signals;
 blanking pulse generation means for processing said processed input signals to produce blanking pulses, said blanking pulse generation means including timing means for altering timing of said processed input signals and matrix means for routing said processed input signals to said outputs and for routing any of said processed input signals to any of said outputs;
 control inputs for supplying to said input processing means logic control signals, so that said logic control signals also produce processed input signals;
 decode logic means for processing encoded transmission band information to provide discrete enable signals to said matrix means, said discrete enable signals being representative of the frequency band o operation of said transmitter having said multiband capability;

microprocessor means coupled to said matrix means for controlling said matrix means to determine said routing; and output means for supplying said blanking pulses, at a predetermined voltage level, to said outputs.

33. The blanking system of claim 32, wherein said decode logic means includes a look-up table, said lookup table providing predetermined control inputs in response to said encoded transmission band information.

34. An electronic blanking system having a plurality of inputs, said inputs including a plurality of voltage or current pulses of varying duration, said blanking system also having a plurality of outputs for supplying blanking pulses, said system comprises input processing means for processing input pulses from said inputs to produce processed input signals;

blanker pulse generation means for processing said processed input signals to produce blanking pulses, said blanker pulse generation means including timing means for altering timing of said processed input signals and matrix means for routing said processed input signals to said outputs and for routing any of said processed input signals to any of said outputs;

microprocessor means coupled to said matrix means for controlling said matrix means to determine said routing;

a programmable memory means having a first portion for storing instructions for said microprocessor means and a second portion for storing data to determine at least one of the operation of said timing means and said matrix means, said second portion of said programmable memory means including regions for storing data sets for programming said blanking system for a plurality of different blanking applications;

application selector means for permitting selection of one of said data sets stored for programming; and output means for supplying said blanking pulses, at a predetermined voltage level, to said outputs.

35. The blanking system of claim 34, wherein said application selector means is responsive to an installation identification input which identifies a particular installation for said blanking system and wherein said application selector means selects said one of said data sets in accordance with the installation identification input supplied.

* * * * *

UNITED STATES PATENT AND TRADEMARK OFFICE
CERTIFICATE OF CORRECTION

PATENT NO. : 4,856,079
DATED : August 8, 1989
INVENTOR(S) : JANET E. WEDGWOOD ET AL It is certified that error appears in the above-identified patent and that said Letters Patent is hereby corrected as shown below:

```
Col.  3, line 38, "system:" should be --system--
Col.  4, line 63, "simulate" should be --simulated--
Col.  5, line 63, "A'--B'" should be --A'-B'--
Col.  6, line 65, "typical" should be --typical. The short modifiers--
Col.  7, line 58, "Clock" should be --Clock--
Col.  8, line 17, "Jammer" should be --jammer--
Col.  9, line 19, "in put" should be --input--
Col. 11, line 36, "fror:" should be --from--

Col. 14, line 66, which is claim 14, "put" should be "output"
Col. 15, line 65, which is claim 23, "programmable" should be --programming--
Col. 16, line 42, which is claim 31, "sad" should be --said--
         line 67, which is claim 32, "o" should be --of--
Col. 17, line 16, which is claim 34, "Comprises" should be --comprising--
```

Signed and Sealed this

Fourth Day of November, 1997

Attest:

BRUCE LEHMAN

Attesting Officer

Commissioner of Patents and Trademarks